United States Patent
Carpenter et al.

(10) Patent No.: US 6,438,481 B1
(45) Date of Patent: Aug. 20, 2002

(54) SELECTABLE TRIMS FOR A CONTROL SYSTEM ALGORITHM

(75) Inventors: Jeffrey M. Carpenter, Canton; Gregory B. Schymik, Lincoln Park; Thopmas R. Tarry, Farmington; Douglas Priemer, Fraser; Bernard Dumm, Walled Lake; Richard Gillipsie, Canton; John Jacobs, Royal Oak, all of MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/521,045

(22) Filed: Mar. 8, 2000

Related U.S. Application Data

(60) Provisional application No. 60/123,396, filed on Mar. 8, 1999.

(51) Int. Cl.[7] ................................................. G06G 7/76
(52) U.S. Cl. .............................. 701/70; 701/78; 701/79; 303/122.06
(58) Field of Search .............................. 701/37, 70, 71, 701/78, 79; 303/9.62, 122.06, 176

(56) References Cited

U.S. PATENT DOCUMENTS

| | | | |
|---|---|---|---|
| 4,130,095 A | * 12/1978 | Bowler et al. | 123/675 |
| 4,550,360 A | 10/1985 | Dougherty | |
| 5,465,209 A | * 11/1995 | Sammut et al. | 701/37 |
| 6,167,354 A | * 12/2000 | Maleki et al. | 702/147 |

* cited by examiner

*Primary Examiner*—Gertrude Arthur
(74) *Attorney, Agent, or Firm*—MacMillan, Sobanski & Todd, LLC

(57) ABSTRACT

A method of selecting a performance trim set for a control algorithm from multiple performance trims sets contained in a read only memory. The selected trim set is used by a control system for a motor vehicle, such as a traction control system. The selected trim set is determined by a trim set identification. The trim set identification is determined every ignition cycle from the system messages. A default trim set identification can be provided until the vehicle identification for a particular motor vehicle is received through the system messages. Thus, a failsafe is provided to ensure that a valid trim set is used for that particular motor vehicle.

31 Claims, 4 Drawing Sheets

US 6,438,481 B1

SELECTABLE TRIMS FOR A CONTROL SYSTEM ALGORITHM

CROSS REFERENCE TO RELATED APPLICATIONS

This application claims the benefit of U.S. Provisional Application No. 60/123,396, filed Mar. 8, 1999.

BACKGROUND OF THE INVENTION

This invention relates in general to a method of selecting a trim set for a control system algorithm, and in particular, selecting a performance trim set for a vehicle control system which corresponds to a particular vehicle from a plurality of trim sets.

Many new vehicles include systems for controlling the braking of the individual wheels. Such systems can include an anti-lock braking capability to prevent wheel lock up during sudden stops and/or a traction control capability to prevent driven wheels from slipping upon low mu road surfaces. Recently, control systems have been further developed to enhance the stability of a moving vehicle.

Referring now to the drawings, there is illustrated in FIG. 1 typical brake control system 10. The system 10 is intended to be exemplary and it will be appreciated that there are other brake control systems having more or less components. In FIG. 1, hydraulic brake lines are shown as solid lines while electrical connections are shown as dashed lines. While single dashed lines are shown, it will be understood that the lines can represent a plurality of individual wires or a data buss. Additionally, mechanical connections are shown by dotted lines.

The system 10 shown is for a front wheel drive vehicle having a pair of front wheels 11 driven through a transaxle 12 by a transversely mounted engine 13. The transaxle 12 and engine 13 both include a microprocessor, 14 and 15, respectively for controlling the unit. Both front wheels 11 have associated front wheel brakes 16 which are connected though a pair of normally open solenoid actuated front isolation valves 18 to the front reservoir of a dual reservoir master cylinder 20. A pair of solenoid operated front dump valves 22 are connected to the hydraulic lines between the front wheel brakes 16 and the isolation valves 18. The front dump valves 22 are operable to bleed hydraulic fluid from the front wheel brakes 16 to an front wheel brake accumulator 24 and to an input port of a front wheel brake pump 26. The discharge of the front pump 26 is connected through a pair of check valves 28 and dump valves 22 to the front wheel brakes 16.

The rear reservoir of the master cylinder 20 is connected through a single rear isolation valve 30 and a single rear dump valve 32 to the wheel brakes 34 associated with the vehicle rear wheels 35. The rear dump valve 32 is operable to bleed hydraulic fluid from the rear wheel brakes 34 to an rear wheel brake accumulator 36 and to an input port of a rear wheel brake pump 38. The discharge of the rear pump 38 is connected through a check valve 40 and the rear dump valve 32 to the rear wheel brakes 34. Both the front and rear pumps 26 and 38 are driven by a common electric motor 42.

Usually the solenoid valves 18, 22, 32 and 36 are mounted within a control valve body (not shown). The pumps 26 and 38 also are included within the control valve body while the pump motor 42 is mounted upon the exterior of the control valve body.

The brake control system 10 further includes an Electronic Control Unit (ECU) 44 which has a microprocessor 45. The ECU 44 receives electric power through a vehicle ignition switch 46. The ECU 44 is electrically coupled to the pump motor 42, the solenoid valve coils associated with the solenoid valves 18, 22, 30 and 32 and a plurality of wheel speed sensors 47 for monitoring the speed and deceleration of the controlled wheels. The ECU 44 may also be connected to acceleration sensors 48 mounted upon directly upon the vehicle. The ECU 44 is typically mounted upon the control valve body to form a compact unit which is often referred to as an electro-hydraulic control unit.

For an Anti-Lock Bake System (ABS), the microprocessor 45 in the ECU 44 continuously receives speed signals from the wheel speed sensors 47 and any acceleration sensors 48. The microprocessor 45 monitors the wheel speed signals for a potential wheel lock-up condition. When the vehicle brakes are applied and the microprocessor 45 senses an impending wheel lock-up condition, the microprocessor 45 is operative to actuate the pump motor 42 and selectively operate the solenoid valves 18, 22, 30 and 32 to cyclically relieve and reapply hydraulic pressure to the controlled wheel brakes 16 and 34. The hydraulic pressure applied to the controlled wheel brakes 16 and 34 is adjusted by the operation of the solenoid valves 18, 22, 30 and 32 to limit wheel slippage to a safe level while continuing to produce adequate brake torque to decelerate the vehicle as desired by the driver. For traction control, the brakes are applied to the driven wheels 11 to assure that the wheel does not begin spinning on a low mu surface. Some traction control systems also communicate with the engine control microprocessor 14 to reduce engine speed and/or torque upon sensing wheel slippage. Finally, for stability control, the wheel brakes 16 and 34 are selectively actuated to maintain the vehicle upon a desired course.

A control algorithm is stored in a Read Only Memory (ROM) 49 for the microprocessor 45 in the ECU 44. The control algorithm includes the formulas and threshold values utilized by the microprocessor 45 when the control system is actuated. While a single control algorithm can be used for a variety of vehicles, the threshold values and constants loaded into the algorithm need to be selected to correspond to characteristics of the particular vehicle. Such vehicle characteristics include the vehicle weight, braking capacity, engine size, transaxle characteristics, ect. The threshold values and constants which are loaded into the control algorithm are commonly referred to as a performance trim set for the algorithm.

Typically, a specific performance trim set for a vehicle requires programming in a programmable memory, such as an Erasable Programmable Read Only Memory (EPROM), during production of the control module or when the control module is delivered to the customer. As indicated above, the trim set may provide target information for a vehicle control system, such as, a Traction Control System (TCS), a Vehicle Stability Control (VSC), and an Anti-Lock Braking System (ABS), and the like. After programming the electronic control module, the trim set would be used for the lifetime of the ECU 44 and would be valid as long as the vehicle configuration remains constant.

SUMMARY OF THE INVENTION

This invention relates to selecting a performance trim set for a vehicle control system which corresponds to a particular vehicle from a plurality of trim sets.

As described above, a performance trim set corresponding to a particular vehicle is loaded into an electronic control module. Once loaded, the trim set is fixed. Should the control module be installed in a different vehicle or a vehicle component, such as the engine and/or transaxle or transmission be changed, the algorithm would no longer be trimmed for optimal operation of the brake control system. Accordingly, it would be desirable to provide a method for matching the performance trim set to the particular vehicle components associated with the vehicle in which the control module is installed.

The present invention contemplates a method of selecting a trim set for a vehicle control system algorithm from a plurality of trim sets which includes determining a parameter related to at least one vehicle component. A trim set corresponding to the parameter is then selected and loaded into the vehicle control system algorithm.

The method also includes comparing the determined parameter to a set of allowable parameters and loading the corresponding trim set only upon the parameter being included in the set of allowable parameters. If the parameter is not included in the set of allowable parameters, an error flag is set and the control system is disabled.

The method includes sending an interrogatory message over a vehicle communication bus to the vehicle component and receiving a reply from the vehicle component which identifies the system parameter over the vehicle communication bus. In the preferred embodiment, the interrogatory message is sent to an engine control computer and the parameter is an engine identification code. Alternately, the interrogatory message is sent to a transaxle control computer and the parameter is a transaxle identification code.

The invention also contemplates determining a plurality of parameters related to a plurality of vehicle components and then selecting a trim set which corresponds to the plurality of parameters. As described above, each of the parameters so determined is compared to a set of allowable parameters and the method proceeds only upon each of the parameters being included in the set of allowable parameters.

The method further includes selecting a trim set identification code, the trim set identification code being a function of the plurality of system parameters. The trim set identification code is compared to a set of allowable trim set identification codes and an error flag is set if the trim set identification code is not included in the set of allowable trim set identification codes. The trim set identification code is then utilized to select the trim set which is loaded into the control algorithm. A default trim set identification code can be selected upon closure of the vehicle ignition switch and the trim set corresponding to the default trim set identification code is loaded into the vehicle control algorithm.

It is contemplated that the algorithm can be for an anti-lock brake system, a traction control system or a vehicle stability control system.

The invention also contemplates a system for controlling at least one vehicle wheel brake which includes at least solenoid valve adapted to be connected to a vehicle brake system. A microprocessor is electrically connected to the solenoid valve and adapted to be connected to a vehicle ignition switch. The microprocessor is operative to selectively actuate said solenoid valve. The system also includes a memory associated with the microprocessor. A control algorithm for controlling the microprocessor and a plurality of sets of trim values for the algorithm are stored in the memory. The microprocessor is operative, upon closure of the ignition switch to determine a parameter related to at least one vehicle component, select a trim set corresponding to the parameter, and load the trim set into the control algorithm.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
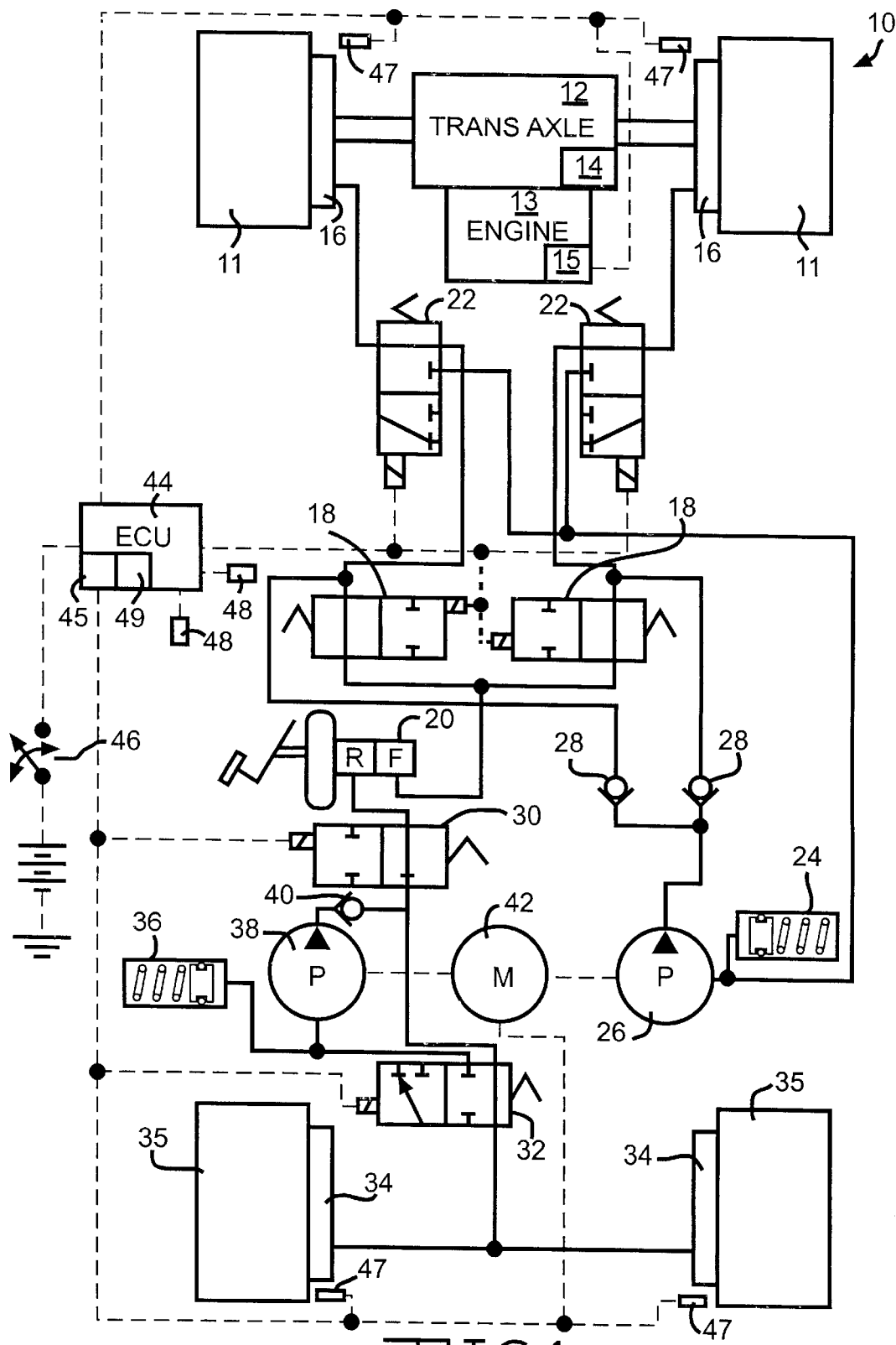
FIG. 1 is a schematic diagram of a typical prior art brake control system.
Figure 2:
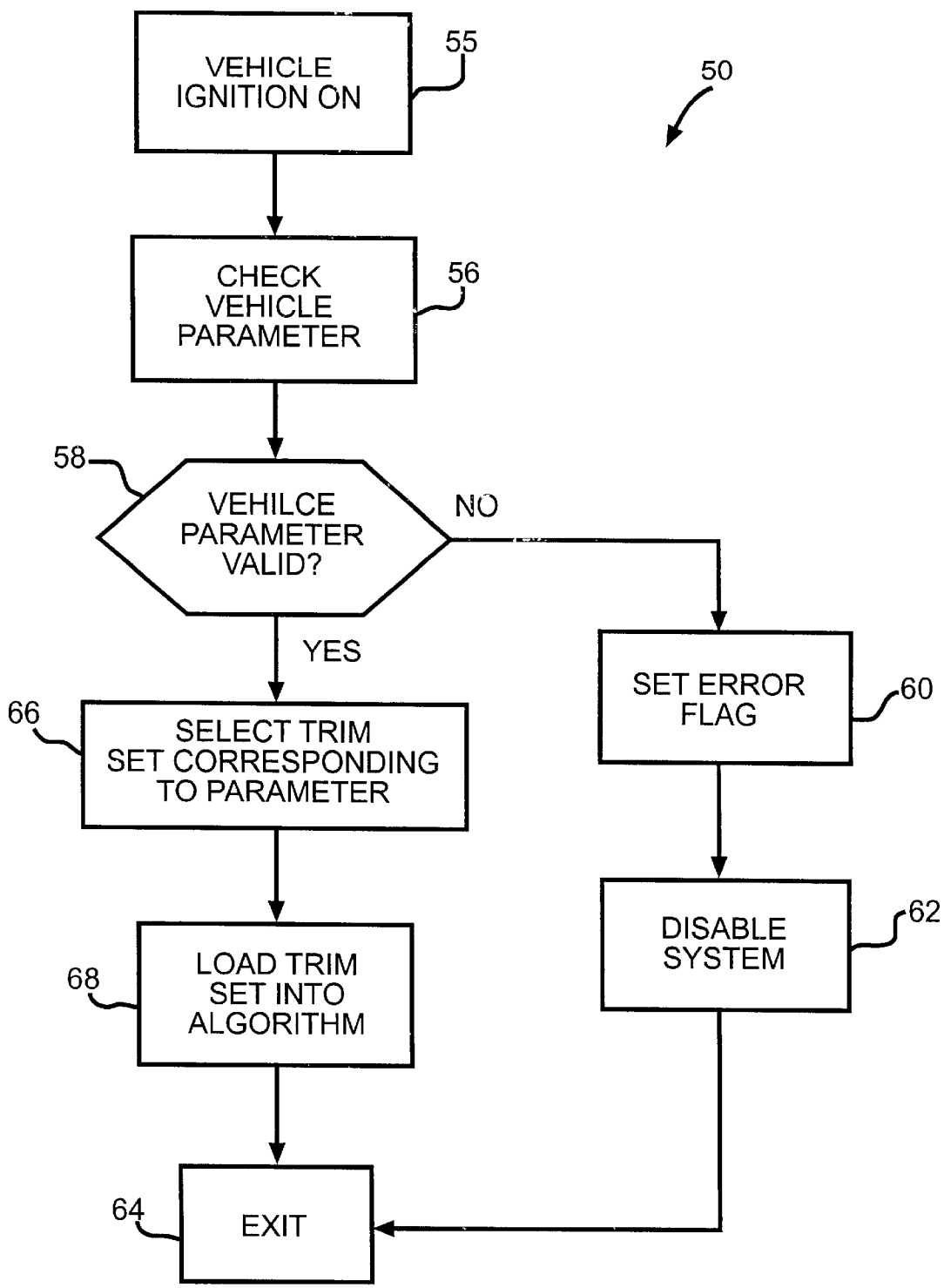
FIG. 2 is a flow chart for a subroutine for selection algorithm trims in accordance with the invention.

Referring again to the drawings, there is illustrated in FIG. 2 a flow chart for a subroutine 50 in accordance with the invention for selection of a set of trims for a control algorithm. The control algorithm is utilized to control a system included in a vehicle. In the preferred embodiment, the control algorithm controls a traction control system; however, the algorithm also can be used to control other vehicle systems, such as, for example, anti-lock brake and vehicle stability control systems. For illustrative purposes, a traction control system will be described in the following discussion. Also, the following discussion will refer to brake control system components illustrated in FIG. 1.

As shown in functional block 55, the subroutine 50 is entered upon the vehicle ignition switch being closed. The closure of the ignition switch provides power to a number of other systems included in the vehicle and which are controlled by dedicated microprocessors having memory capability. Examples of such vehicle systems include the engine 13, automatic transmission, and trans axle 12. As shown in FIG. 1, all such systems are typically interconnected by a vehicle communication bus. Additional vehicle identification data, such as the Vehicle Identification Number (VIN) also can be stored in the memory of one of the system microprocessors.

Following closure of the ignition switch, the traction control microprocessor 45 interrogates one of the other vehicle system microprocessors, such as, for example, the engine control microprocessor 15, as shown in functional block 56. The interrogation consists of a request for an engine identification code sent over the vehicle communication bus from the traction control microprocessor 45 to the engine control microprocessor 15. Upon receipt of the request, the engine control microprocessor 15 retrieves the engine identification code from the memory associated with the engine control microprocessor and sends the code to the traction control microprocessor 45.

In functional block 58, the traction control microprocessor compares the engine identification code to a set of possible engine identification codes stored in the microprocessor ROM 49. If the engine identification code does not correspond to one of the stored codes, the subroutine 50 transfers to functional block 60 where an error flag is set and then to functional block 62 where the traction control system is disabled. The subroutine 50 then exits to the main traction control algorithm through functional block 64. Upon return to the main algorithm, the error flag will cause a signal to be generated to warn the vehicle operator that the traction control system is disabled and that service is needed.

If the engine identification code is determined to be valid in decision block 58, the subroutine 50 transfers to functional block 66 where a trim set corresponding to the particular engine type is selected from a plurality of trim sets stored in the Read Only Memory (ROM) 49. In the preferred embodiment, seven trim sets are stored in the ROM 49; however, more or less trim sets can be included in the ROM 49. The selected trim set is loaded into the traction control algorithm in functional block 68. The subroutine then exits through functional block 64 to return to the main traction control algorithm.

It will be appreciated that the subroutine 50 is used only once upon closure of the ignition switch. Accordingly, a flag would be set in the main traction control algorithm to bypass the subroutine 50 upon the subsequent entry into the traction control algorithm. Also, the use of the engine control microprocessor 15 above is intended to be exemplary and it will be appreciated that other vehicle system microprocessors could be used for alternate vehicle parameters. For example, the microprocessor 14 for controlling the transaxle 12 could be interrogated to obtain a transaxle identification code for selection of the traction control trim set. Additionally, the flow chart shown in FIG. 2 is intended to illustrate the invention and it will be appreciated that the invention can be practiced with other flow charts. For example, the disabling of the traction control system in functional block 62 could alternately be accomplished by the main traction control algorithm in response to the setting of the error flag.

Figure 3:
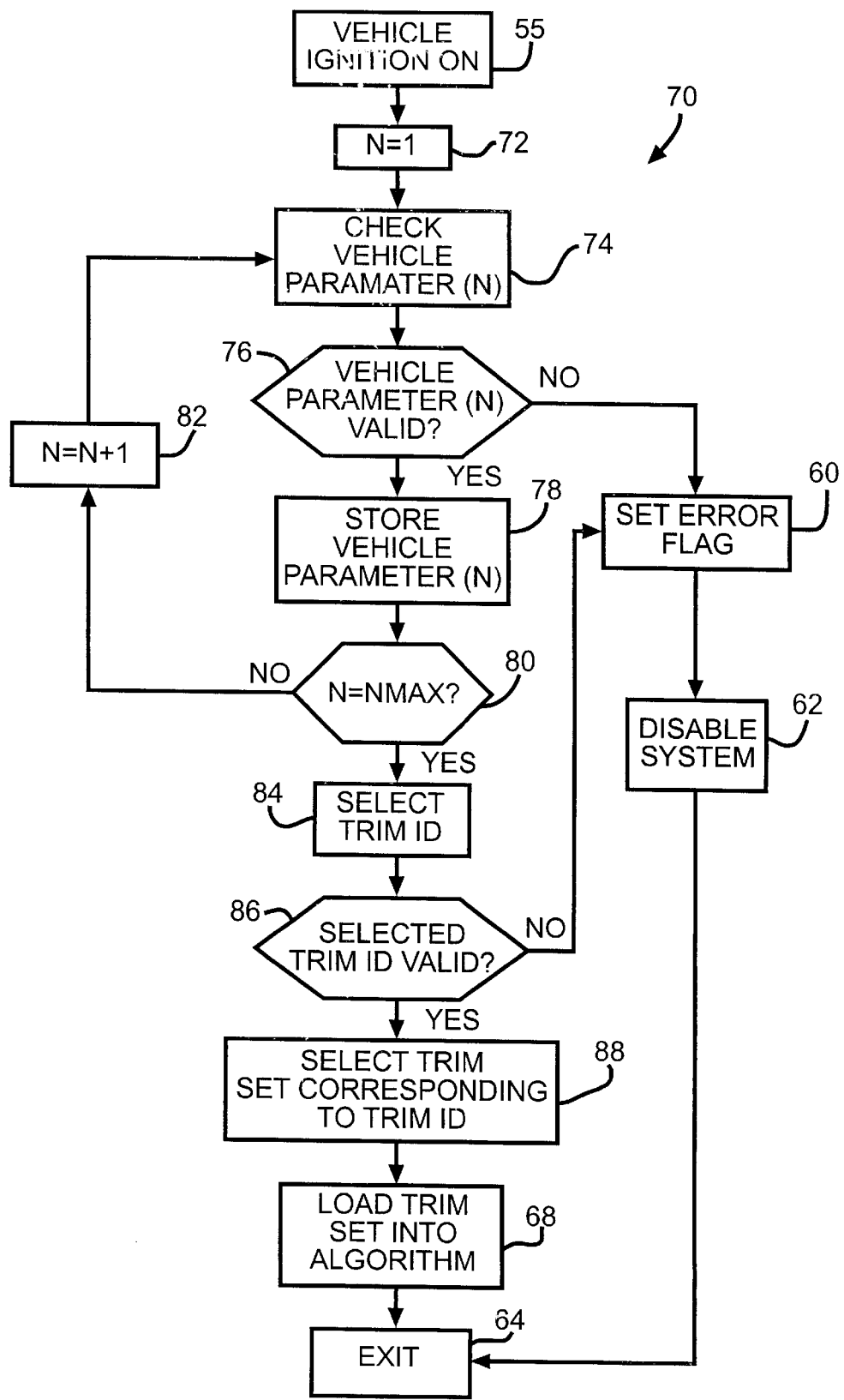
FIG. 3 is an alternate embodiment of the flow chart shown in FIG. 2.

The invention also contemplates an alternate embodiment which selects a trim set that corresponds to a plurality of vehicle parameters. An exemplary flow chart for a subroutine 70 for such an alternate embodiment is illustrated in FIG. 3. Blocks shown in FIG. 3 which are similar to blocks shown in FIG. 2 have the same numerical designators. As above, the following description is for a traction control system; however, it will be appreciated the invention also can be practiced with other systems, such as, for example, anti-lock brake or vehicle stability control systems.

As described above, the subroutine 70 is entered through functional block 55 upon closure of the vehicle ignition switch. The subroutine 70 then proceeds to functional block 72, where an index, N, is. set equal to one. The index N corresponds to the number of vehicle parameters which are used to select the trim set. The subroutine then transfers to functional block 74 where the first vehicle parameter is requested from the corresponding microprocessor. As above, the received vehicle parameter is compared to valid parameters in decision block 76. The valid parameters are stored in the microprocessor ROM 49. If the received vehicle parameter does not correspond to a valid value, the subroutine 70 transfers to functional block 60 where an error flag is set and then to functional block 62 where the traction control system is disabled. The subroutine 70 then exits to the main traction control algorithm through functional block 64. Upon return to the main algorithm, the error flag will cause a signal to be generated to warn the vehicle operator that the traction control system is disabled and that service is needed.

If the received vehicle parameter is determined to be valid in decision block 76, the subroutine 70 transfers to functional block 78 where the vehicle parameter is stored. The subroutine 70 then transfers to functional block 80 where the current value of the index N is compared to a maximum index value, NMAX. In the preferred embodiment, the trim set is chosen to correspond to the vehicle engine and transaxle. Accordingly, NMAX is equal to two for the preferred embodiment; however, the invention can be practiced for checking any number of vehicle parameters. If NMAX has not been reached, the subroutine transfers to functional block 82 where the index N is incremented by one. The subroutine 70 then returns to functional block 74 where the next vehicle parameter is checked and, if the received vehicle parameter is valid, the subroutine 70 proceeds again to functional block 78 where received vehicle parameter is stored.

The subroutine 70 continues to iterate until either a parameter does not match a valid value, or the maximum index value NMAX is reached. Upon reaching the maximum index value NMAX, the subroutine transfers from decision block 80 to functional block 84 where a trim set identification code, ID, which corresponds to the stored vehicle parameters, is selected from a look up table. An example of such a look up table is shown below for a vehicle which can be built having one of three engine types and four transmission types:

| Trim ID | Engine Type | Transmission Type |
|---------|-------------|-------------------|
| 1 | 2.4 Liter I4 | 3 Speed Automatic |
| 2 | 2.4 Liter I4 | 4 Speed Manual |
| 3 | 3.0 Liter V6 | 3 Speed Automatic |
| 4 | 3.0 Liter V6 | 4 Speed Automatic |
| 5 | 3.0 Liter V6 | 4 Speed Manual |
| 6 | 3.4 Liter V6 | 4 Speed Automatic |
| 7 | 3.4 Liter V6 | 4 Speed Manual |

In the above table, the manufacturer has provided seven combinations of the three engines and four transmissions for a particular vehicle. Each engine and transmission combination is identified by a trim identification code. For example, a vehicle having a 3.0 liter V6 engine coupled to a 4 speed manual transmission would use trim set no. 5. Once the trim set identification code ID has been selected, the subroutine 70 transfers to decision block 86 where the selected trim set ID is compared to a list of valid trim set ID's. If the selected trim set ID does not match one of the valid choices, the subroutine 70 transfers to functional block 60 where the error flag is set and then exits through functional block 62 where the system is disabled.

If the selected trim set ID is valid, the subroutine 70 proceeds to functional block 88 where the trim set corresponding to the value of the trim identification code is selected from the ROM 49. The selected trim set is loaded into the algorithm in functional block 68 and the subroutine exits through functional block 64 back to the main traction control algorithm. As stated above, in the preferred embodiment, seven trim sets are stored in the ROM 49; however, the invention also can be practice for more or less trim sets.

Figure 4:
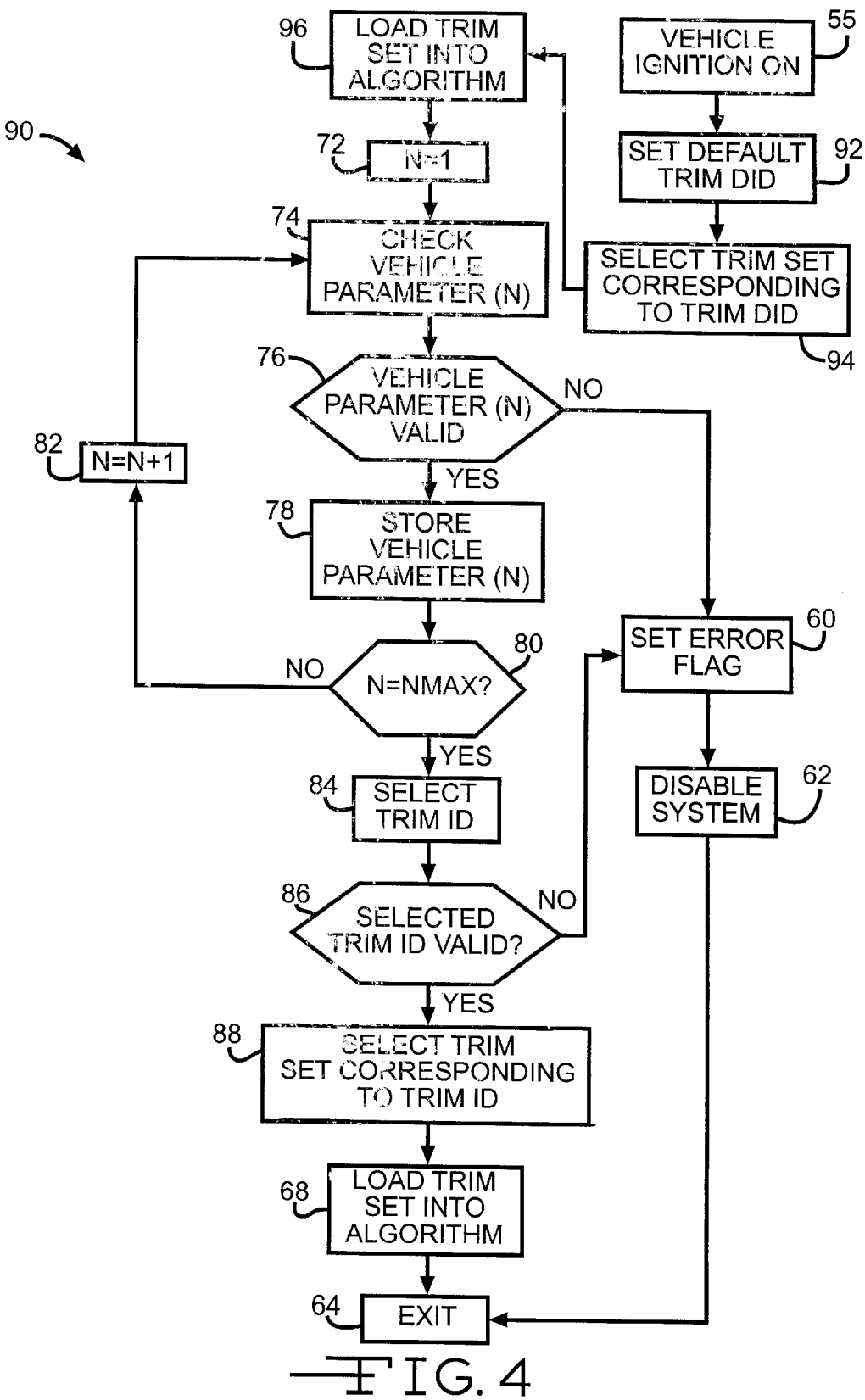
FIG. 4 is another alternate embodiment of the flow chart shown in FIG. 2.

The invention further contemplates providing a default trim set identification code, DID, until the vehicle component identification for a particular motor vehicle is received through the system messages. An alternate subroutine which is incorporates this feature is illustrated by the flow chart 90 shown in FIG. 4. Blocks shown in FIG. 4 which are similar to blocks shown in FIG. 3 have the same numerical designators. Immediately following the closure of the vehicle ignition switch in functional block 55, the subroutine 90 transfers to decision block 92 where a default trim set identification code DID is set. One of the valid trim ID's for the vehicle is used for DID. The subroutine 90 then proceeds to blocks 94 and 96 to select and load the corresponding trim set into the control algorithm. The subroutine 90 then continues as described above for the preceding subroutine 70.

Thus, subroutine 90 assures that a trim set is provided immediately upon vehicle start-up. The subroutine 90 also provides a fail-safe function since if the subroutine 90 does not receive the needed vehicle component identification data to determine the trim set identification, the control system is still provided with a performance trim set.

The invention also contemplates generating a warning signal (not shown), such as illumination of a warning light, if the default trim set identification is used for greater than a predetermined period of time or for greater than a predetermined number of ignition switch closures.

As described above, the invention allows storage of multiple vehicle-specific performance trim sets in a ROM associated with the system microprocessor. This allows a single algorithm to be used for multiple vehicles with the appropriate performance trim set used in the algorithm. The trim set that is used is determined by the type of vehicle that the module is placed in. The type of vehicle is determined at power up through messages that are received over the serial communications with the rest of the vehicle. In the preferred embodiment, the engine type and tire/axle scaling factor messages are used to determine the vehicle type; however, other parameters can be used to select the trims. If either message is not received or the engine type and/or tire/axle scaling factors do not correspond to a vehicle type that there are trims for, then the performance control is inhibited.

Previous selectable trim algorithms required programming the trims during production of the ECU or at end of the customer's manufacturing line. As a result, the programmed trim set would be used for the duration of that ECU's lifetime. One important aspect of the invention is that the selectable trims is dynamic and allows the same module to be moved from vehicle to vehicle (as long as the vehicles are a valid configuration) while enabling the proper trim set to be used by the different vehicle. This also allows proper compensation for any changes of vehicle components after production.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of selecting a set of parameters for a vehicle brake control system algorithm, the method comprising the steps of:
    (a) providing a plurality of stored sets of predetermined fixed parameters for the vehicle brake control system algorithm;
    (b) determining a vehicle component identification parameter related to at least one vehicle component upon closure of the vehicle ignition switch;
    (c) selecting one of the stored sets of predetermined fixed algorithm parameters that corresponds to the vehicle component identification parameter; and
    (d) loading the selected algorithm parameter set into the vehicle brake control system algorithm.

2. A method of selecting a set of parameters for a vehicle control system algorithm, the method comprising the steps of:
    (a) providing a plurality of stored sets of parameters for the vehicle control system algorithm;
    (b) determining a vehicle component identification parameter related to at least one vehicle component upon closure of the vehicle ignition switch;
    (c) comparing the vehicle component identification parameter to a set of allowable vehicle component identification parameters and proceeding to the next step only upon the vehicle component identification parameter being included in the set of allowable vehicle component identification parameters;
    (d) selecting one of the stored sets of predetermined algorithm parameters that corresponds to the vehicle component identification parameter; and
    (e) loading the selected algorithm parameter set into the vehicle control system algorithm.

3. The method according to claim 2 wherein an error flag is set when the vehicle component identification parameter is not included in the set of allowable vehicle component identification parameters.

4. The method according to claim 3 wherein the vehicle control system is disabled when the vehicle component identification parameter is not included in the set of allowable vehicle component identification parameters.

5. The method according to claim 3 wherein step (b) includes sending an interrogatory message over a vehicle communication bus to the vehicle component and receiving a reply from the vehicle component which identifies the system parameter over the vehicle communication bus.

6. The method according, to claim 5 wherein the interrogatory message is sent to an engine control computer and the vehicle component identification parameter is an engine identification code.

7. The method according to claim 5 wherein the interrogatory message is sent to a transaxle control computer and the vehicle component identification parameter is a transaxle identification code.

8. A method of selecting a set of parameters for a vehicle control system algorithm, the method comprising the steps of:
    (a) providing a plurality of stored sets of parameters for the vehicle control system algorithm;
    (b) determining a plurality of vehicle component identification parameters related to a plurality of vehicle components upon closure of the vehicle ignition switch;
    (c) comparing each of the vehicle component identification parameters determined in step (b) to a set of allowable vehicle component identification parameters and proceeding to the next step only upon each of the vehicle component identification parameters being included in the set of allowable vehicle component identification parameters;
    (d) selecting one of the stored sets of predetermined algorithm parameters that corresponds to the plurality of vehicle component identification parameters; and
    (e) loading the selected algorithm parameter set into the vehicle control system algorithm.

9. The method according to claim 8 wherein an error flag is set when one of the vehicle component identification parameters is not included in the set of allowable vehicle component identification parameters.

10. The method according to claim 9 wherein step (b) includes sending interrogatory messages over a vehicle communication bus to a plurality of vehicle components and receiving a reply which identifies the vehicle component identification parameter from each of the vehicle components over the vehicle communication bus.

11. The method according to claim 10 wherein step (c) further includes selecting an algorithm parameter set identification code, the algorithm parameter set identification code being a function of the plurality of vehicle component identification parameters determined in step (b), and further wherein step (c) includes selecting an algorithm parameter set which corresponds to the algorithm parameter set identification code.

12. The method according to claim 11 wherein the algorithm parameter set identification code is compared to a set of allowable algorithm parameter set identification codes and the method proceeds to select the algorithm parameter set only upon the algorithm parameter set identification code being included in the set of allowable algorithm parameter set identification codes.

13. The method according to claim 12 wherein an error flag is set when the algorithm parameter set identification code is not included in the set of allowable algorithm parameter set identification codes.

14. The method according to claim 13 further including in step (b) selection of a default algorithm parameter set identification code upon closure of the vehicle ignition switch and loading the algorithm parameter set corresponding to the default algorithm parameter set identification code into the vehicle control algorithm.

15. The method according to claim 14 wherein the algorithm is for a traction control system.

16. The method according to claim 14 wherein the algorithm is for a vehicle stability control system.

17. The method according to claim 14 wherein the algorithm is for an anti-lock brake system.

18. The method according to claim 8 wherein the control system is disabled when one of the vehicle component identification parameters is not included in the set of allowable vehicle component identification parameters.

19. A system for controlling at least one vehicle wheel brake comprising:
at least one solenoid valve adapted to be connected to a vehicle brake system;
a microprocessor electrically connected to said solenoid valve, said microprocessor adapted to be connected to a vehicle ignition switch and operative to selectively actuate said solenoid valve;
a memory associated with said microprocessor;
a control algorithm for controlling said microprocessor stored in said memory, and;
a plurality of sets of predetermined fixed parameter values for said algorithm also stored in said memory, said microprocessor operative, upon closure of said ignition switch, to determine a vehicle component identification parameter related to at least one vehicle component, select one of the stored sets of predetermined fixed algorithm parameters that corresponds to said vehicle component identification parameter, and load said algorithm parameter set into said control system algorithm for controlling at least one vehicle wheel brake.

20. A system for controlling at least one vehicle wheel brake comprising:
at least one solenoid valve adapted to be connected to a vehicle brake system;
a microprocessor electrically connected to said solenoid valve, said microprocessor adapted to be connected to a vehicle ignition switch and operative to selectively actuate said solenoid valve;
a memory associated with said microprocessor;
a control algorithm for controlling said microprocessor stored in said memory, and;
a plurality of sets of parameter values for said algorithm also stored in said memory, said microprocessor operative, upon closure of said ignition switch, to determine a plurality of vehicle component identification parameters related to a plurality of vehicle components and to compare each of said vehicle component identification parameters determined by said microprocessor to a set of allowable vehicle component identification parameters, said microprocessor further operable, only upon each of said vehicle component identification parameters being included in said set of allowable vehicle component identification parameters, to select an algorithm parameter set that corresponds to said vehicle component identification parameters and to load said algorithm parameter set into said control system for controlling at least one vehicle wheel brake.

21. The system according to claim 20 wherein an error flag is set when one of said vehicle component identification parameters is not included in said set of allowable vehicle component identification parameters.

22. The system according to claim 20 wherein the control system is disabled when one of said vehicle component identification parameters is not included in said set of allowable vehicle component identification parameters.

23. The system according to claim 21 wherein said determination of said vehicle component identification parameters includes sending interrogatory messages over a vehicle communication bus to a plurality of vehicle components and receiving a reply which identifies said vehicle component identification parameter from each of said vehicle components over said vehicle communication bus.

24. The system according to claim 23 wherein said microprocessor is operable to select an algorithm parameter set identification code, said algorithm parameter set identification code being a function of said plurality of said vehicle component identification parameters, and further wherein said microprocessor selects an algorithm parameter set which corresponds to said algorithm parameter set identification code.

25. The system according to claim 24 wherein said algorithm parameter set identification code is compared to a set of allowable algorithm parameter set identification codes and said microprocessor proceeds to select said algorithm parameter set only upon said algorithm parameter set identification code being included in said set of allowable algorithm parameter set identification codes.

26. The system according to claim 25 wherein an error flag is set when said algorithm parameter set identification code is not included in said set of allowable algorithm parameter set identification codes.

27. The system according to claim 26 wherein said microprocessor selects a default algorithm parameter set identification code upon closure of the vehicle ignition switch and further wherein said microprocessor loads an algorithm parameter set corresponding to said default algorithm parameter set identification code into said vehicle control algorithm.

28. The system according to claim 27 wherein the system is an anti-lock brake system.

29. The system according to claim 27 wherein the system is a traction control system.

30. The system according to claim 27 wherein the system is a vehicle stability control system.

31. A system for controlling at least one vehicle wheel brake comprising:
at least one solenoid valve adapted to be connected to a vehicle brake system;
a microprocessor electrically connected to said solenoid valve, said microprocessor adapted to be connected to a vehicle ignition switch and operative to selectively actuate said solenoid valve;

a memory associated with said microprocessor;

a control algorithm for controlling said microprocessor stored in said memory, and;

a plurality of sets of parameter values for said algorithm also stored in said memory, said microprocessor operative, upon closure of said ignition switch, to determine a vehicle component identification parameter related to at least one vehicle component and to compare said vehicle component identification parameter determined by said microprocessor to a set of allowable vehicle component identification parameters, said microprocessor further operable, only upon said vehicle component identification parameter being included in said set of allowable vehicle component identification parameters, to select an algorithm parameter set that corresponds to said vehicle component identification parameter and to load said algorithm parameter set into said control system for controlling at least one vehicle wheel brake.

* * * * *

UNITED STATES PATENT AND TRADEMARK OFFICE
CERTIFICATE OF CORRECTION

PATENT NO.    : 6,438,481 B1
DATED         : August 20, 2002
INVENTOR(S)   : Jeffrey M. Carpenter et al.

It is certified that error appears in the above-identified patent and that said Letters Patent is hereby corrected as shown below:

<u>Title page,</u>
Item [75], delete "Thopmas" and insert -- Thomas --; and delete "Gillipsie" and insert -- Gillespie --.

Signed and Sealed this

Third Day of December, 2002

JAMES E. ROGAN
*Director of the United States Patent and Trademark Office*